Aug. 13, 1968 E. L. SMITH 3,397,303
CONVEYING BELT WITH INTEGRAL ELECTRIC HEATER
AND SHEET MEMBER HOLDDOWN MEANS
Filed Oct. 23, 1965

Inventor
Edwin L. Smith.

Attys 3,397,303
CONVEYING BELT WITH INTEGRAL ELECTRIC HEATER AND SHEET MEMBER HOLDDOWN MEANS
Edwin L. Smith, Wilmette, Ill., assignor to Bell & Howell Company, Chicago, Ill., a corporation of Illinois
Filed Oct. 23, 1965, Ser. No. 502,973
10 Claims. (Cl. 219—545)

ABSTRACT OF THE DISCLOSURE

Apparatus for simultaneously conveying and efficiently heating sheet members, including an electrically conductive endless belt heated by an electric current passing therethrough. The endless belt supports the sheet members and they are maintained in good contact therewith by a pressure differential acting on the sheets through the belt.

---

This invention relates generally to heat apparatus and more particularly to apparatus for heating sheet-form material such as paper sheets for the purposes of drying the sheets, fusing images or markings or indicia thereon, etc.

In many processes wherein it is necessary or desirable to heat sheet-form material it is also advantageous for the heat to be applied as rapidly as possible in order for the heating apparatus to be as productive and as efficient as possible. This is particularly true where the heating apparatus is but a component of a more comprehensive paper-treating machine wherein the overall rate at which the sheets can be treated is a function of the speed at which the sheets can be heated.

For example, in the photographic and allied arts some machines embody a number of stations through which the sheets pass during treatment or processing. Often a heating station is involved, and if the other stations are able to perform their functions at a more rapid rate than the heating station the overall production rate of the machine must be reduced to accommodate the rate at which the heating station performs.

In many cases, particularly in multiple station machines, the heating apparatus comprises generally a travelling carrier surface such as an endless belt which receives a sheet to be heated at one point and carries it to a second point with the sheet being heated as it travels from the first to the second point. The source of heat may be a heating lamp located adjacent the carrier surface with the sheets heated by radiation as they pass in front of the lamp.

There are certain disadvantages to the radiation heating system, however, among which are that the heating intensity varies as the sheet moves across the front of the lamp and also that radiation in itself is not the most efficient heat transfer method.

The present invention overcomes many of the disadvantages of known arrangements and enables the sheets to be heated continuously and uniformly and at a rapid rate. The heating method utilized involves direct physical contact, which is the most efficient heat transfer method. The time required to heat the sheet to the required temperature is reduced and the physical dimensional requirements of the heating apparatus are also reduced. These advantages are particularly noteworthy in multiple station machines since the overall size of the machine can often be reduced and the overall production rate of the machine can be increased depending, of course, on the particular machine and the particular process or treatment of the sheets involved.

The present invention utilizes a carrier surface in the form of an endless belt. The belt is looped or trained around a pair of rotatable rollers but instead of the belt running adjacent a heat lamp or other external source of heat in order to heat the sheets carried thereon, the belt itself is heated, and not only at one or more isolated points on the belt but along the entire length of the belt or at least that portion thereof which constitutes the carrier surface.

The belt is made in whole or in part throughout its entire length of electrically conductive material, and the rollers about which it is trained serves as electrodes whereby electric current passes through the belt from one roller electrode to the other to heat the belt electrically. The temperature at which the belt operates can be varied in accordance with variations in the electrical resistance of the material of which the belt is constructed, the voltage applied to the roller-electrodes, the proportion of strands of conductive material to nonconductive material of which the belt is constructed, the ratio of the lengths of the two reaches of the belt between the roller-electrodes, etc.

Further, the belt may be perforated and the loop formed by the belt substantially enclosed and reduced in pressure whereby a sheet supplied to the belt is held thereto by a pressure differential across the two sides of the sheet, also affording greater physical contact and therefore greater heat transfer between the belt and the sheet.

The concepts of the invention can be embodied in simplified constructions, thereby reducing manufacturing costs and maintenance problems and expense. Further wide variations are possible in the sizing of parts, heating capabilities, etc., such that the invention has utility in wide variety of applications and can be accommodated by numerous multiple station machines.

It is, therefore, an object of the present invention to provide heating apparatus for sheet-form material which effectively heats the material in reduced time periods.

Another object of the invention is to provide such heating apparatus wherein the entire sheet carrier surface is maintained at a uniform temperature.

Still another object is to eliminate, in heating apparatus comprising an endless travelling belt, external heat sources such as heat lamps or belt spot heaters for providing the necessary heating effect.

A further object of the invention is to provide pressure differential means for holding the sheet not only on the belt, but against the belt to increase the physical contact between the sheet and the belt.

Yet another object of the invention is to provide a belt made in whole or in part of electrically conductive material whereby, by the application of electrical power to the belt, the electrical resistance in the belt itself result in a uniform heating of the belt without the requirement of any external source of heat.

Many other features, advantages and additional objects of the present invention will become manifest to those versed in the art upon making reference to the detailed description which follows and the accompanying sheet of drawings, in which preferred structural embodiments incorporating the principles of the present invention are shown by way of illustrative example only.

Figure 1:
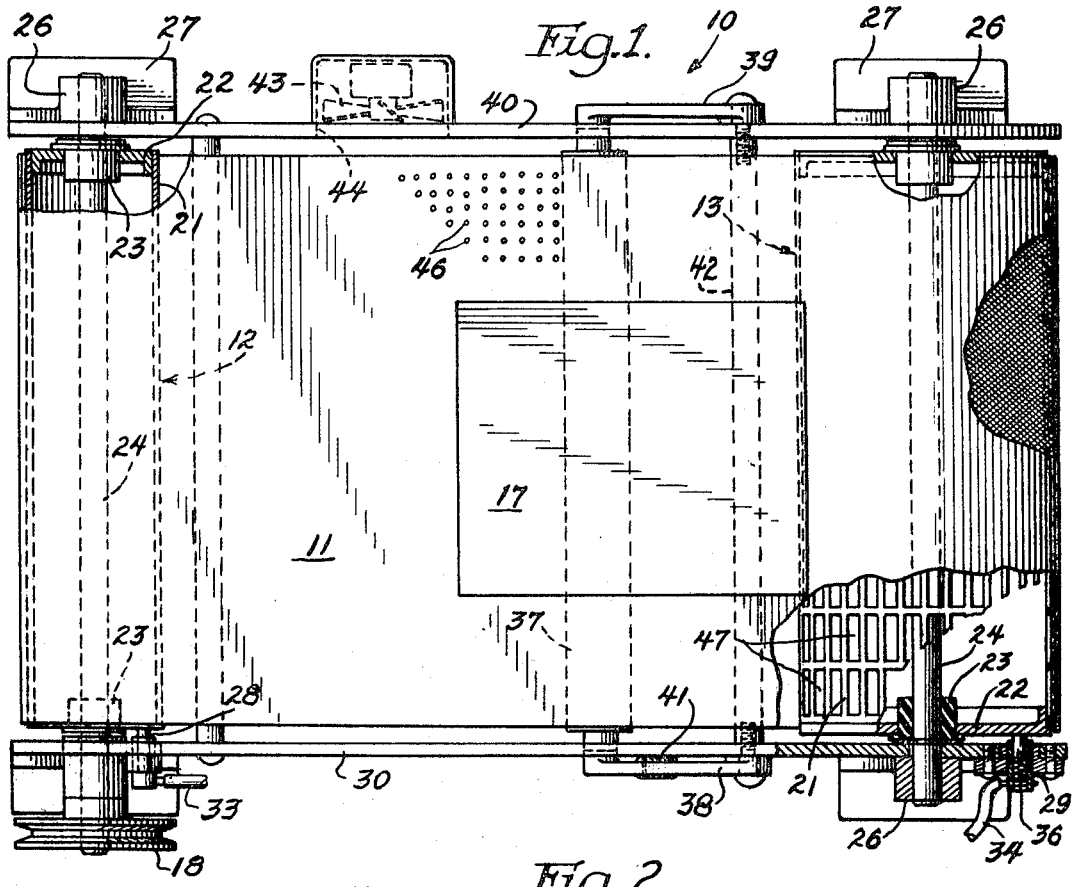
FIGURE 1 is a top plan view of an exemplary embodiment of the invention with portions cut away to show the construction and relative disposition of parts.
Figure 2:
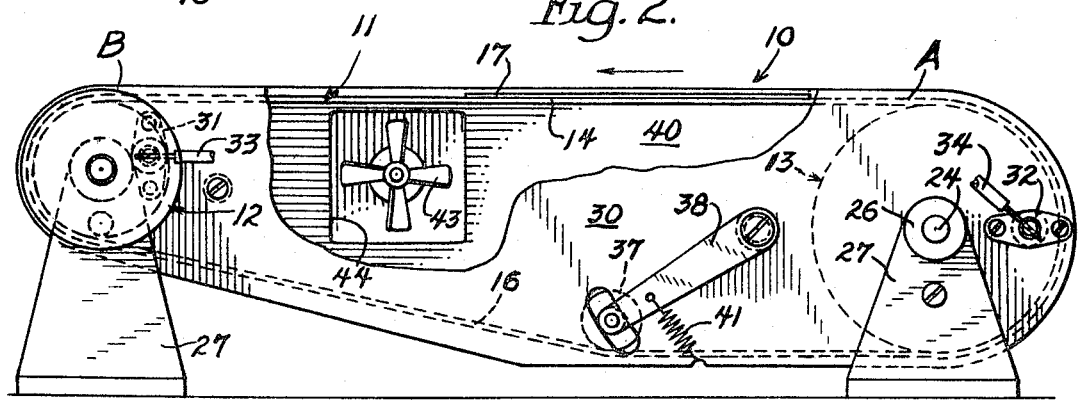
FIGURE 2 is a side elevational view of the embodiment of FIGURE 1.

In FIGURES 1 and 2 reference character 10 indicates generally the heating apparatus of this invention and is noted at the outset that the invention has utility as one component or station of a multiple station machine nd as a unitary apparatus not part of a more comprehensive machine. In either case the intended function of the invention is to heat sheet-form material such as paper sheets to a desired temperature as rapidly as possible. Exemplary applications reside in drying wet photographic sheets and in fusing thermosensitive materials on image bearing members such as master plates for lithographic processes and the like.

The heater assembly 10 is more particularly characterized as comprising an endless travelling belt 11 looped or trained around a pair of rollers 12 and 13 which are mounted for rotation on spaced parallel axes.

In the illustrated embodiment a top reach or span 14 of the belt 11 serves as a carrier surface for the sheet-form material as it is being heated, a bottom reach 16 extending underneath the rollers 12 and 13.

In many cases it is desirable for the sheet being heated to be placed on the belt 11 at one point and to be removed at another point. For example, in some applications of heaters the sheets are automatically supplied to and removed from the heaters and in such instances it is often desirable or necessary from a practical design standpoint to have the supply and removal devices spaced apart from one another.

In order to provide for movement of a typical sheet indicated at 17 as it is being heated on the belt 11 suitable means are provided in the embodiment illustrated for turning the belt by rotating at least one of the rollers, the belt and the other roller being driven by frictional forces between the engaging surfaces of the belt and the rollers. Thus, a pulley 18 is shown mounted on the roller 12 for connection to suitable driving means such as an electric motor by an associated V-belt drive. The belt 11 is indicated by the arrow as being driven in a counterclockwise direction as viewed in FIGURE 2, but of course the direction in which the belt is driven is not critical and can be changed.

Accordingly, the sheet 17 may be deposited on the top reach 14 of the belt 11 at one end thereof indicated at reference character A and removed at an opposite end B thereof. The sheet must be heated to the required temperature as it is being transported from end A to end B and it will be appreciated that the greater the heating capabilities of the assembly 10 the greater is the speed at which the belt 11 can be driven and the greater is the number of sheets which can be heated per unit of time.

In accordance with the principles of the invention the sheets are directly heated by the belt 11 and to this end the belt is constructed in whole or in part of electrically conductive material which extends the entire length of the belt 11. The surfaces of the rollers 12 and 13 which actually engage the belt are also constructed of electrically conductive material and serve as electrodes to supply a flow of current through the belt 11 between the roller-electrodes 12 and 13 in two parallel paths.

For example, the belt 11 may be made of a flexible fabric comprising graphite or carbon yarns which can be used as filaments or woven into cloth. Such yarns, although they approach glass fiber in physical appearance (tensile strength, flexing properties, etc.), are conductors of electricity and when an electric current is passed through the yarn becomes heated due to its electrical properties and in proportion to the electrical energy dissipated.

Other yarn such as wool or glass fiber may be added to the carbon yarn, depending upon such factors as the desired electrical resistance of the yarn, the desired temperature of the belt, etc.

Figure 3:
FIGURE 3 is an enlarged fragmentary vertical sectional view of an exemplary embodiment of the electrically conductive heating belt of the invention.

In FIGURE 3, the yarn which is woven into the cloth of the belt 11 is indicated at 19, and in order to protect the belt, prevent unraveling of the edges, and to provide strength and mechanical stability, the belt may be covered with a high temperature, flexible coating 20 such as silicone rubber. In addition, the belt 11 may be made completely of nonconductive yarn and covered with a flexible conductive coating in order to achieve the desired electrical and heating properties.

The rollers 12 and 13 are similar in essential respects and comprise respectively a cylindrical shell 21, a pair of end caps 22 mounted securely at the ends of the shell 21, an insert or bushing 23 press fit or the like in each of the end caps 22 and a shaft 24 journalled at the ends thereof in a pair of bearings 26 which are supported on a pair of brackets or flanges 27. The shell 21 and the end caps 22 are constructed of electrically conductive material and the bushings 23 are made of nonconductive material to electrically insulate the shaft 24 from the end caps 22 and the shell 21.

In order to electrically energize the roller-electrodes 12 and 13 a pair of brushes 28 and 29 are mounted on an end plate 30 adjacent respectively one of the end caps 22 of the rollers 12 and 13. Brushes 28 and 29 are housed in a pair of insulating brackets 31 and 32 and suitable electric wiring 33 and 34 is connected to the brushes. The end plate 30 extends perpendicularly to the axes of rollers 12 and 13 and is mounted on brackets 27, 27. The brushes are biased into physical contact with their respective end caps 22 by suitable biasing means as, for example, a helical spring shown at 36.

Thus, when electric power is supplied to the brushes 28 and 29 two paths of electric current are established between the roller-electrodes 12 and 13, namely, the top and bottom reaches 14 and 16 of the electrically conductive belt 11. The electrical resistance offered by the belt maintains each of the reaches 14 and 16 at a uniformly high temperature across the lengths thereof.

The temperature of the top reach or carrier surface 14 (the "active" surface in the illustrated embodiment) can be varied with respect to the bottom reach 16 by varying the lengths of the two reaches. Accordingly the length of the belt 11 may be somewhat oversized and a nonconductive idler roller 37 situated within the loop formed by the belt 11 and urged downwardly in pressing engagement with the bottom reach 16 in order to provide tautness to the belt and to cause the lower reach 16 of the belt to be longer than the carrier surface 14, thereby causing the carrier surface to be heated to a higher temperature than the lower reach 16.

The idler roller 37 is mounted on a pair of swingable arms 38 and 39 which in turn are mounted for pivotal movement on the end plate 30 and an opposite complemental end plate 40. In order to maintain a good downward pull against the bottom reach 16 a tension spring 41 interconnects the end plate 30 and the swingable arm 38 and the two arms are interconnected for corotation by means of a transverse bar 42.

In order to permit a relatively rapid rate of speed of the belt 11 it is desirable that means be provided for holding the sheet 17, which in many instancs may be very light, on the carrier surface 14 as the sheet is moved along from end A to end B. It is also desirable with a view to efficient heat transfer for the sheet to be held against the carrier surface with a significant pressure to ensure a good physical contact between the two, and more desirably this pressure should be constant across the entire face of the sheet in order to provide uniform heating.

In accordance with the principles of the present invention the belt 11 is pervious in a transverse direction so as to admit therethrough and a vacuum condition is produced within the loop formed by the belt whereby a sheet 17 deposited on the belt will be urged considerably thereagainst as a result of the difference in pressure acting on the two sides of the sheet. The end plates 30 and 40 are dimensioned and situated with respect to the belt such as to effectively enclose the loop formed by the belt although it will be appreciated that a completely airtight arrangement is not necessary.

The vacuum condition within the loop is provided by suitable means such as an exhaust fan 43 mounted on the end plate 40 for drawing air from the loop through an aperture 44 formed in the end plate 40. The perviousness of the belt can be controlled by a selection of the yarn size and weave and if a coating is applied to the belt a series of apertures as at 46 in FIGURES 1 and 3 can be formed therein in selected sizes and arrangements.

The perviousness of the belt 11 and the vacuum produced in the loop formed thereby can also be useful in picking up or transferring sheets or the like to the belt. Furthermore the shells 21 of the roller-electrodes 12 and 13 may be formed of lattice or ribber construction with open spaces therein as at 47 so that the sheet 17 will be urged by the vacuum onto the carrier surface 14 even at those portions of the belt which are trained around the rollers 12 and 13.

Although minor modifications might be suggested by those versed in the art, it should be understood that we wish to embody within the scope of the patent warranted hereon all such modifications as reasonably come within the scope of our contribution to the art.

I claim as my invention:

1. Apparatus for heating sheet-form material comprising
   a pair of rotatable rollers,
   and endless, electrically conductive belt trained around the rollers for receiving thereon the material to be heated,
      said belt being fabricated of graphite filaments and nonconductive fibers and said rollers having electrically conductive portions thereof in contact with said belt to provide a continuous electric circuit from one of said rollers through said belt to the other of said rollers,
   electric circuit means for energizing said portions of said rollers, and
   means for rotating one of said rollers to move the belt around the rollers.

2. The apparatus as defined in claim 1 wherein said nonconductive fibers comprise wool, said filaments being woven with said wool fibers to form a pliable endless belt.

3. The apparatus as defined in claim 1 wherein said nonconductive fibers comprise glass, said filaments being interwoven with said glass fibers to form a durable endless belt.

4. Apparatus for heating sheet-form material comprising
   a pair of rotatable rollers,
   an endless belt trained around the rollers for receiving thereon the material to be heated,
      said rollers having electrically conductive portions thereon and said belt being made of nonconductive material coated with a flexible conductive coating in contact with said electrically conductive portions of said rollers to provide an electrical path from one of said rollers through said coating to the other of said rolers,
   means for rotating one of said rollers to move said belt around said rollers.

5. Apparatus for heating travelling sheet-form material comprising
   an endless perforate belt at least in part made of electrically conductive material,
   means supporting the belt for movement around the loop formed thereby and including a pair of spaced electrodes in electrical contact with said belt, and
   means for providing a pressure differential across a substantial area of the belt for holding the sheet-form material to be heated on the belt and in greater physical contact with the belt.

6. Apparatus for heating travelling sheet-form material comprising
   an endless perforate belt at least in part made of electrically conductive material,
   means supporting the belt for movement around the loop formed thereby and including a pair of spaced electrodes in electrical contact with said belt, and
   means contained entirely within said loop effecting a vacuum therein for holding the sheet-form material to be heated on the belt and in greater physical contact therewith.

7. Apparatus for heating a travelling sheet comprising
   an endless perforate belt at least in part made of electrically conductive material,
   a pair of perforate roller-electrodes rotatably mounted on spaced parallel axes situated within the loop formed by the belt for receiving the belt in trained-around relation,
   means for rotating one of said roller-electrodes,
   electric brush means connected to said roller-electrodes to provide a path of electric current from one roller-electrode through said belt to the other of said roller-electrodes,
   means substantially enclosing the loop formed by said belt including the ends of said roller-electrodes, and
   vacuum means communicating with the interior of said loop including said roller-electrodes to provide a vacuum within the loop.

8. Apparatus for heating a travelling sheet comprising
   a pair of spaced parallel end walls,
   a pair of electrically conductive perforate rollers rotatably mounted on spaced parallel axes between said end walls,
      each of said rollers having electrical conductive end caps,
   an oversized perforate endless electrically conductive belt trained around said rollers between said end walls whereby the end walls substantially enclose the loop formed by said belt,
   means for rotating at least one of said rollers,
   a pair of electric brushes mounted on said end walls and biased into engagement with said end caps of said rollers, respectively,
   a nonconductive idler roller mounted on said end walls within said loop,
   means biasing said idler roller outwardly against the belt to take up the belt slack whereby one reach of the belt between the rollers is shorter than and provides less electrical resistance than the other reach of said belt, and
   means providing a vacuum within the belt loop to hold a sheet to be heated on the belt and to urge the sheet into greater physical contact with the belt.

9. Apparatus for heating sheet-form material comprising
   an elongated perforate belt at least in part made of electrically conductive material for receiving the sheet-form material to be heated on one side thereof,
   a pair of electrodes contacting the ends of the belt to provide a flow of current therethrough, and
   means for providing a vacuum on the opposite side of the belt acting simultaneously over substantially the entire area of said sheet-form material to hold the material to be heated on and in greater contact with said belt.

10. Apparatus for heating a travelling sheet comprising
    a pair of roller-electrodes rotatably mounted on spaced parallel axes,
    an elongated perforate belt trained around said rollers at least in part made of electrically conductive material for receiving said sheet to be heated on one side thereof,
    said roller electrodes providing a path for electric current through said belt and defining open spaces therethrough to the roller surface,
    means for transporting said sheet material to a position adjacent said belt trained roller, and
    means for providing a vacuum on the opposite side of said belt and through said opening spaces effecting a vacuum pickup for transferring said sheet material from said transporting means to said belt.

References Cited

UNITED STATES PATENTS

| | | | |
|---|---|---|---|
| 1,401,303 | 12/1921 | Baldwin | 219—538 |
| 1,741,882 | 12/1929 | Robinson | 219—388 X |
| 1,910,868 | 5/1933 | Webb | 34—223 |
| 2,526,650 | 10/1950 | Gaibel | 83—171 |
| 2,711,781 | 6/1955 | Langer | 219—388 X |
| 2,972,669 | 2/1961 | Brown | 83—171 |
| 3,123,700 | 3/1964 | Snyder et al. | 219—388 |
| 3,236,205 | 2/1966 | Kopito | 118—49.1 |

BERNARD A. GILHEANY, *Primary Examiner.*

VOLODYMYR Y. MAYEWSKY, *Assistant Examiner.*